2 Sheets—Sheet 1.

J. BARNES.
Broadcast-Seeder.

No. 27,958. Patented Apr. 24, 1860.

J. BARNES.
Broadcast-Seeder.
No. 27,958.  Patented Apr. 24, 1860.
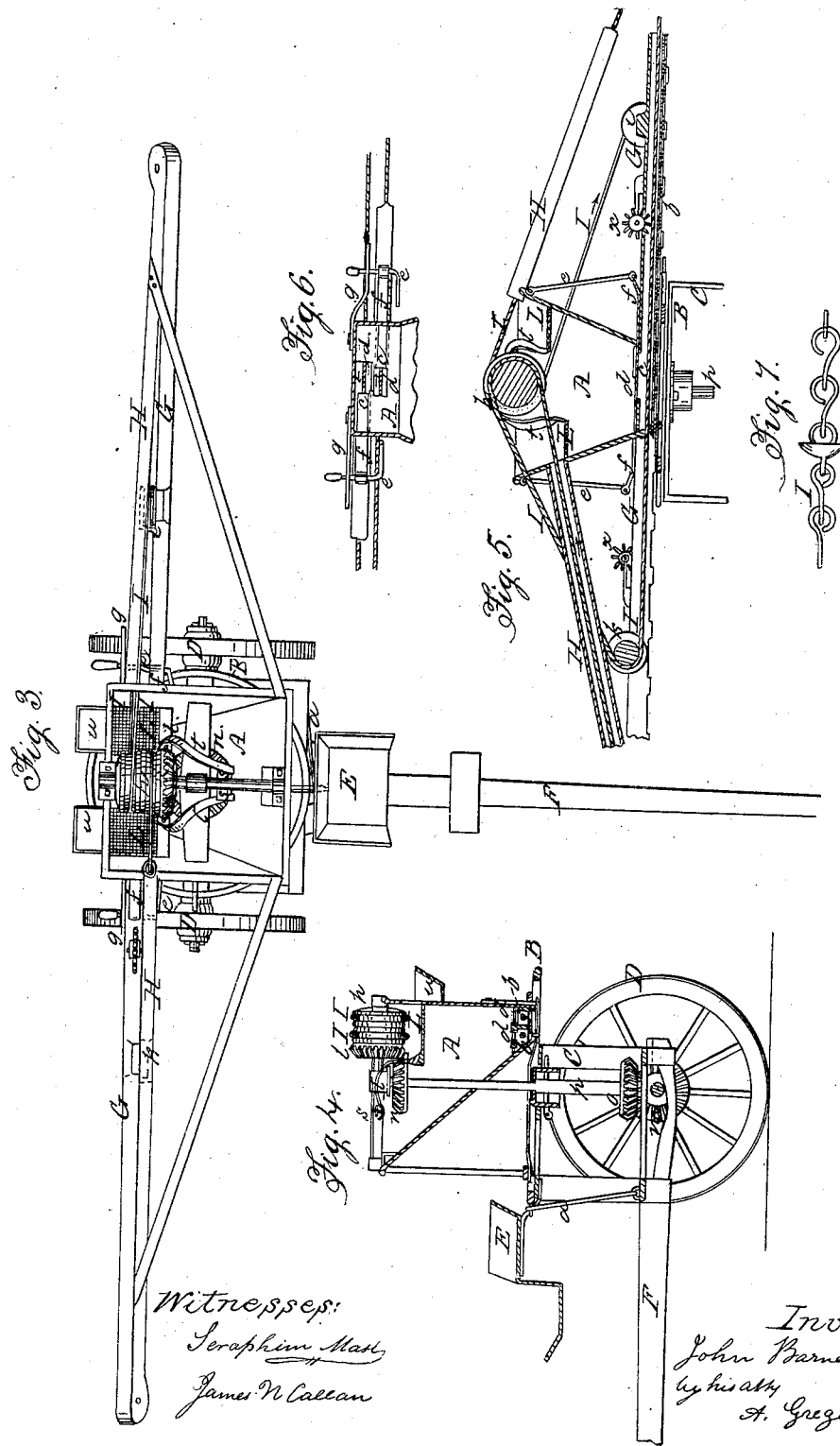

UNITED STATES PATENT OFFICE.

JOHN BARNES, OF LIMA, NEW YORK.

IMPROVEMENT IN BROADCAST SEEDING-MACHINES.

Specification forming part of Letters Patent No. 27,958, dated April 24, 1860.

*To all whom it may concern:*

Be it known that I, JOHN BARNES, of Lima, in the county of Livingston and State of New York, make known that I have invented certain new and useful Improvements in Broadcast Sowing by Machinery; and I do hereby declare that the following description and accompanying drawings, which form part of this specification, explain the same in a sufficiently illustrative or explicit manner to enable others practically acquainted with "broadcast sowers" of a different character or construction to build and operate this my invention.

The nature of my present invention consists, first, in an entirely novel and useful manner of sowing broadcast by machinery by causing the seed, or whatever it may be that is required to be sowed, to be conveyed from a hopper or seed-box connected with the vehicle that is made to traverse the field in such a way as that said seed is caused to run or be taken from said box along hollow arms, pipes, or conduits for any desired distance to and beyond either side of the vehicle, and so agitated and distributed and let drop as to secure a more advantageous broadcast sowing of the seed through orifices in the pipes or conduits, as the current or currents of seed pass along said pipes and circulate therethrough, substantially as hereinafter specified; and my invention or improvement further consists in the novel employment or combination of certain new and useful mechanical contrivances or their equivalents for operation in connection with a broadcast sower, essentially as hereinafter specified, and having a close or advantageous relationship with the method of sowing by this my invention, as above indicated.

Figure 1:
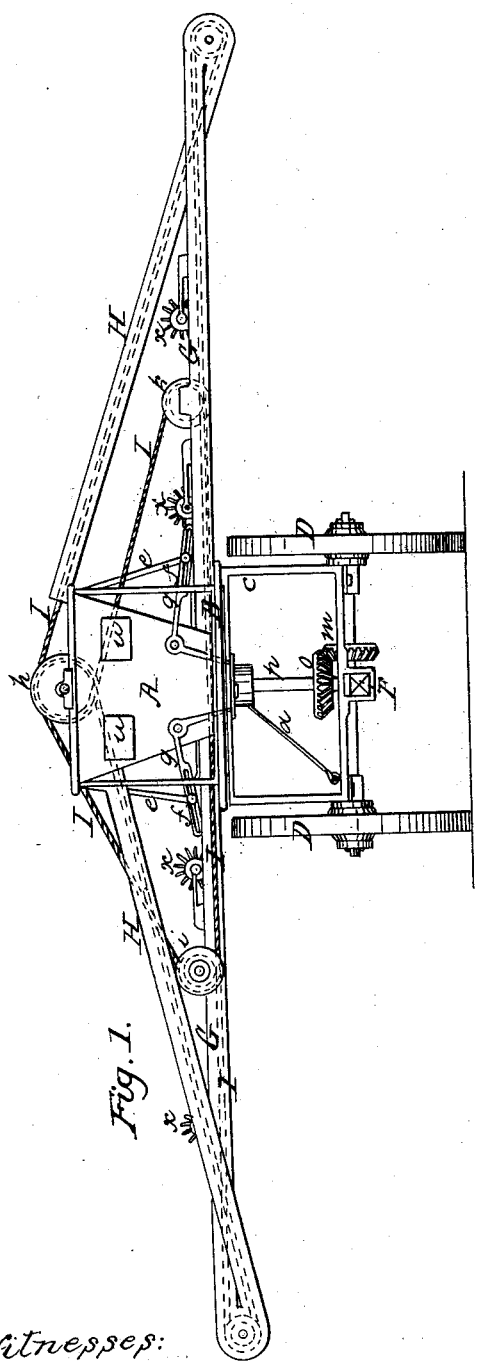
Figure 2:
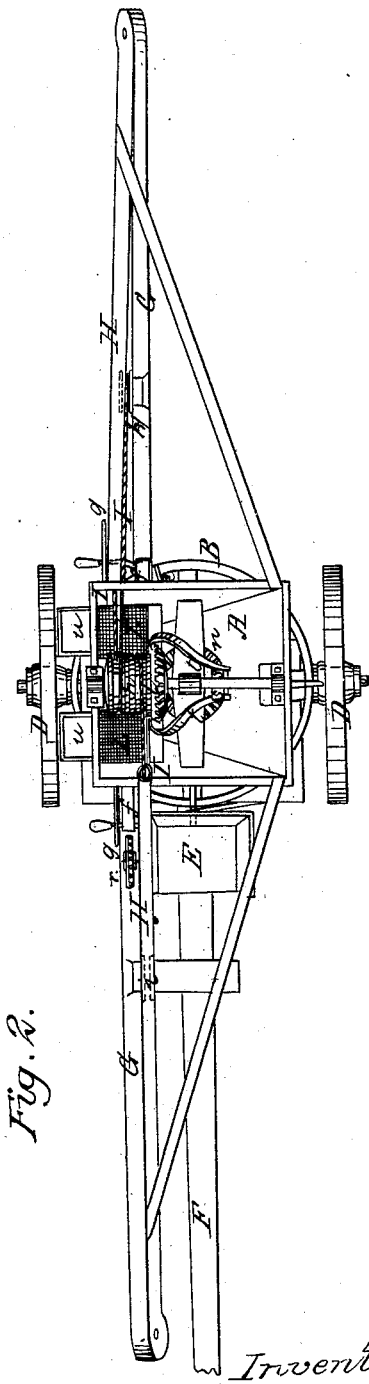

The accompanying drawings represent a broadcast seed-sowing machine constructed according to or in illustration of my discovery, and details connected therewith. In these drawings, Figure 1 represents a rear view of such a broadcast seed-sower with its parts in position for sowing; Fig. 2, a plan view of the same with its distributing-arms out of position for sowing and adjusted or folded to facilitate the travel of the machine to and from the field, or through gates and narrow lanes or passages; Fig. 3, a similar view, but with the distributing-arms extended for sowing. Fig. 4 represents a mainly-central vertical section of the machine in direction of the draft; Fig. 5, a vertical section of the machine, in part, taken at right angles to the former figure, and intersecting one of the distributing-arms in its extended position; Fig. 6, a sectional plan of the seed-box portion of the machine, with its regulating slides and some of its other appurtenances. Fig. 7 represents in part one form of conveyer that may be used for circulating the seed through the distributing-pipes.

Referring to the several figures in the accompanying drawings, and to the letters or marks thereon, A indicates a hopper, in which seed or grain is put for to be sown. This hopper is shown arranged on a turning platform or table, B, of the vehicle, of which latter C is the body or frame; D D, the wheels; E, the driver's seat, and F the draft bar or pole for the team. The hopper A is thus arranged and elevated above the level or height of the running-wheels of the vehicle, in order that the distributing-arms G G, which gear with or are connected to the hopper near its bottom, may be turned to project beyond the sides of the vehicle—say as in Figs. 1 and 3—for sowing over a much broader track than that of the vehicle, or so that they may be folded into within the width of the vehicle proper, or thereabout, by, say, turning them to occupy a position parallel to the draft, or nearly so, to facilitate the travel of the machine through field-gates, narrow lanes, or passages, and for the more convenient housing of the machine.

A rod, $a$, hooking onto pins projecting from the table B, may serve to hold the table from turning after it has been adjusted to extend or fold the distributing-arms G G, so as to retain the latter in their set position.

The distributing-arms G G are provided with suitable perforations along them (see Fig. 5) to effect the required distribution of the seed, and the egress of the latter shut off or opened and the amount of discharge regulated by perforated slides $b$, arranged to control the perforated sides or bottoms of the distributing arms, tubes, or conduits. There are also arranged in the hopper A slides $c$ $c$, (see Fig. 6,) to shut or open and control the discharge of seed through apertures $d$ $d$ in the hopper to the distributing-arms G G, and I prefer that these latter slides and the slides in or along the distributing-arms, on or to either side of the machine, should be so connected as that the shutting off, opening, or regulating the hopper-slides c c necessitates a similar adjustment of the slides b in the distributing-arms, whereby the supply of seed from the hopper to the distributing-arms is adjusted and made to correspond with the discharge from the latter, and the discharge shut off or opened in both by merely moving to the right or to the left pendent levers e e, which are connected by rods f f and slotted bell-cranks g g with the hopper and distributing-arms' slides, or by employing and operating any suitable substitutes for these contrivances to effect like results. The hopper and distributing-arms' slides may, however, if preferred, be made capable of separate adjustment, or, on the other hand, they may not only be connected on each side of the machine, but all the slides controlling the discharge on both sides of the draft be connected, so as to make the distribution of seed necessarily equal from both arms. It is well, however, to have the slides regulating the discharge of seed on one side of the machine independent of those on the other side of the machine, as here shown, so that only half the width of ground may be sown, as compared with a discharge of seed throughout the length of both arms, when circumstances require such contraction; or the slides or additional slides to both sides may be made capable of regulating the width open to distribution of the seed on both sides of the draft. Both sets of slides may be arranged to be under the control of the driver while on his seat, if desired.

For sowing wheat the distributing-apertures in the arms G G should be less open than for sowing oats or barley.

As the distributing-arms G G are not designed as mere scatterers of the seed, or to throw it so as to produce irregular distribution of the seed throughout the width sown, but are intended to distribute the seed evenly and equally, or nearly so, throughout the entire width, and as to effect this the seed is carried along or made to circulate through the distributing-arms, so that in the passage of it a portion may be "let drop" through the orifices in the distributing-arms, it is essential that the distributing-arms should be sufficiently large and the circulation of the seed through them be such as to insure or admit of a good supply of seed at the outer ends of the arms as well as nearer to the hopper and throughout the arms. To keep up this circulation of seed through the distributing-arms G G there must be vents at the outer ends of the latter, or near the outer ends, for the surplus seed. These vents may connect with any suitable receiving-chambers, and these chambers be emptied of their accumulating contents, at intervals or continuously, into the main hopper. Thus, I connect the outer ends of the distributing-arms G G by spirally curved or bent elbows with gradually-inclining upper conduits or pipes, H H, arranged to communicate at their inner ends with the upper part of the hopper A; and I further employ an endless chain or rope conveyer to produce circulation and agitation of seed from the hopper through or along and in the distributing-arms, and to convey the surplus seed issuing at the ends of the distributing-arms back up the inclined pipes H H to the hopper A. This endless conveyer I, if made of chain, may or may not have buttons at suitable distances apart on it, (see Fig. 7,) or, if made of rope or cord, have similarly-arranged attachments or drags, to secure the proper passage and agitation of the seed along the distributing-arms and the delivery of the surplus seed back into the hopper. A single endless cord or chain may answer the purpose for both sides of the machine by, for instance, first passing it from a central drum, h, round a pulley, i, on the left-hand-side distributing-arm, then back through the hopper and along the right-hand-side distributing-arm round a pulley at the far end in the spirally-curved elbow of said arm and up the right-hand-side surplus-seed return-pipe, then round another groove in the central drum, h, and back to the right over a pulley, k, in the right-hand-side distributing-arm, back again through the hopper and along the left-hand side-distributing-arm, round a pulley at its outer end and up through its surplus-seed return-pipe back to the central drum, h. Motion may be given to the central drum, h, by the machine as it moves to operate the conveyer I by bevel-pinions l m on the central drum-shaft and vehicle-axle in gear with other bevel-pinions, n o, on a vertical shaft, p. Any suitable uncoupling arrangement may be used for throwing the conveyer in and out of gear.

Spider-wheels x x may be hung in the distributing-arms to keep the rope or chain conveyer down to its work in the arms.

In sowing spring wheat it often happens that oats and barley are mixed with the wheat, and it is an object to effect their separation, or that of other foreign matter or impurities, from the seed to be sown. Sieves have before been arranged in connection with seed-hoppers for this purpose, but never, that I am aware, been employed as I here use sieves for the purpose. Thus, L L are sieves situated underneath the delivery ends of the surplus seed return-pipes H H, so as to receive the surplus seed as it returns to the hopper in thin or small quantities as compared with its discharge therefrom. These sieves may be agitated by means of toes s s on the central drum-shaft, made to strike arms or springs t t, or by any other means, or in any other way, the coarser grain or other foreign matter being thus shaken off the sieves into boxes or pockets u u, while the wheat will be sifted back into the hopper to be returned by the endless chain or conveyer back through the distributing arms or pipes. Thus a portion, at least, of the wheat becomes sifted over and over again.

From the description I have here previously given of the general operation of the machine it will be apparent that there is no analogy between the method here indicated for sowing broadcast and those modes heretofore adopted in which either the seed-hopper and vehicle are made broad and the hopper punctured and provided with a distributing apparatus for the direct discharge of the seed to the ground throughout the length of the hopper, or in which the seed is taken from the hopper and thrown out or scattered, either by a vibrating tail-board or its equivalent, or by a revolving scatterer or its equivalent. These two previously-known methods have their peculiar objections, and both are practically inferior for sowing over a large width of ground in a single run or traverse of the vehicle. The latter of these previously-known methods is necessarily uneven in the distribution of the seed, and in windy weather often totally impracticable, while the former of said methods, with its broad hopper and vehicle, rendering passage through narrow field-gates difficult and yet affording comparatively narrow distributing provision, scarcely needs comment here. To remove these objections in part it has before been proposed to use two hoppers not provided with any outside circulating and distributing apparatus or return-pipes, but pivoted at their inner ends to the vehicle-frame, so as to admit of being extended transversely to the draft to sow the seed, through perforations in them, beyond the sides of the vehicle, and of being adjusted to lie within a lesser width or longitudinally to the vehicle when not required to sow; but such hoppers are necessarily cumbersome to adjust and very restricted as to the extent of ground they cover as compared with light pipes fed from a general supply box or reservoir, and in such the weight of seed is not centralized within the draft, but so much of it is sustained by the vehicle outside the draft or vehicle track as, especially if the hoppers are long ones, to produce jerk alternately at opposite sides on or against the horses in traveling over rough or broken ground. Such and other objections are materially lessened or avoided and the leading advantages of the above-named two old systems combined by this my invention. For instance, the vehicle need not exceed in width that of an ordinary wagon, the bulk of the seed may be centralized, and the whole machine arranged to travel within an ordinary wagon-track and so as to pass through a field gate of usual width or along a narrow lane or passage, yet when adjusted for sowing the seed may be evenly distributed over a track many times wider than that of the vehicle, and the seed not thrown or loosely scattered, but carried out beyond either side of the vehicle-track and regularly and carefully allowed to drop in a steady and even stream or streams, the seed-distributing arms representing virtually an extension of the hopper with the seed at a uniform level throughout, but without the objections of such an extended hopper.

Of course the mechanical contrivances or arrangements for carrying out this my invention may be variously modified.

What I claim as my invention is—

1. The method herein described of sowing broadcast, by combining with a wagon or draft vehicle carrying a seed box or hopper a seed circulating and distributing apparatus constructed to carry or pass the seed from the hopper to and beyond either side of the vehicle along extended hollow arms or conduits perforated to distribute or let the seed drop as it is circulated in a current or currents along the hollow arms or conduits, and the circulation kept up by establishing a vent or return-current for the surplus seed, substantially as specified.

2. The combination and arrangement, substantially as herein specified, for action outside of but in concert with a feeding reservoir or hopper carried by a draft-vehicle, of extended and perforated seed-distributing arms or conduits made capable of projection laterally beyond either side of the hopper and vehicle or track of the latter, and, when not required to sow, of adjustment to within the width of the vehicle, or thereabout, surplus-seed return pipes or conduits, and a conveyer or conveyers operating to circulate the seed through the distributing-arms and return-pipes and pass it for distribution outside of and beyond both sides of the vehicle simultaneously.

3. The combination, with the hopper-discharge valves or slides $c$, of the valves or slides $b$ to the distributing-arms, arranged to operate together and in unison, essentially as shown and described.

4. The combination, with the surplus-seed pipes or conduits, of a sieve or sieves, operating to sift the seed as it is returned from the distributing arms or conduits, essentially as herein set forth.

In testimony whereof I have hereunto subscribed my name.

JOHN BARNES.

Witnesses:
 THOMAS DALRYMPLE,
 J. B. WELLER.